(12) United States Patent
Draper

(10) Patent No.: US 7,504,610 B2
(45) Date of Patent: Mar. 17, 2009

(54) OPTICAL MODULATION AMPLITUDE COMPENSATION SYSTEM HAVING A LASER DRIVER WITH MODULATION CONTROL SIGNALS

(75) Inventor: Daniel S. Draper, Portland, OR (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 66 days.

(21) Appl. No.: 11/825,463

(22) Filed: Jul. 5, 2007

(65) Prior Publication Data

US 2008/0013151 A1    Jan. 17, 2008

Related U.S. Application Data

(63) Continuation-in-part of application No. 11/244,484, filed on Oct. 5, 2005, now Pat. No. 7,265,334, which is a continuation-in-part of application No. 11/134,715, filed on May 20, 2005, which is a continuation-in-part of application No. 10/993,522, filed on Nov. 19, 2004, which is a continuation-in-part of application No. 10/933,561, filed on Nov. 19, 2004, which is a continuation-in-part of application No. 10/933,525, filed on Sep. 3, 2004, now Pat. No. 7,091,564.

(60) Provisional application No. 60/819,256, filed on Jul. 6, 2006.

(51) Int. Cl.
*G01J 1/32* (2006.01)

(52) U.S. Cl. .................... 250/205; 250/214 R

(58) Field of Classification Search ............... 250/205, 250/214 R, 214 C, 201.5, 201.1; 372/29.011–29.015, 372/29.021, 31–38; 369/116, 53.26, 44.12–44.42
See application file for complete search history.

(56) References Cited

U.S. PATENT DOCUMENTS

| 4,534,064 | A | 8/1985 | Giacometti et al. |
| 4,545,078 | A | 10/1985 | Wiedeburg |
| 4,687,924 | A | 8/1987 | Galvin et al. |
| 4,734,914 | A | 3/1988 | Yoshikawa |
| 4,747,091 | A | 5/1988 | Doi |
| 5,019,769 | A | 5/1991 | Levinson |
| 5,039,194 | A | 8/1991 | Block et al. |
| 5,047,835 | A | 9/1991 | Chang |

(Continued)

FOREIGN PATENT DOCUMENTS

EP     1471671     12/2004

(Continued)

*Primary Examiner*—Que T Le
(74) *Attorney, Agent, or Firm*—Weide & Miller, Ltd.

(57) ABSTRACT

The power control system utilizing a normal average power control loop to control average power and modulation level of an optic signal generated by an optic signal generator. The target average power is adjusted by a small percentage, and the corresponding change in bias current needed to adjust the average power level is monitored. The change in average power divided by the change in bias current is a measure of the optic signal generator's slope efficiency. Modulation current is adjusted up or down based on the change in slope efficiency compared to the slope efficiency stored at the time of module calibration. By adjusting the modulation current, the desired optic signal output from the transmitter may be maintained.

20 Claims, 5 Drawing Sheets

U.S. PATENT DOCUMENTS

| | | | |
|---|---|---|---|
| 5,057,932 | A | 10/1991 | Lang |
| 5,334,826 | A | 8/1994 | Sato et al. |
| 5,383,046 | A | 1/1995 | Tomofuji et al. |
| 5,383,208 | A | 1/1995 | Queniat et al. |
| 5,392,273 | A | 2/1995 | Masaki et al. |
| 5,394,416 | A | 2/1995 | Ries |
| 5,396,059 | A | 3/1995 | Yeates |
| 5,448,629 | A | 9/1995 | Bosch et al. |
| 5,488,627 | A | 1/1996 | Hardin et al. |
| 5,510,924 | A | 4/1996 | Terui et al. |
| 5,557,437 | A | 9/1996 | Sakai et al. |
| 5,574,435 | A | 11/1996 | Mochizuki et al. |
| 5,594,748 | A | 1/1997 | Jabr |
| 5,636,254 | A | 6/1997 | Hase et al. |
| 5,673,282 | A | 9/1997 | Wurst |
| 5,812,572 | A | 9/1998 | King et al. |
| 5,822,099 | A | 10/1998 | Takamatsu |
| 5,844,928 | A | 12/1998 | Shastri et al. |
| 5,900,959 | A | 5/1999 | Noda et al. |
| 5,926,303 | A | 7/1999 | Giebel et al. |
| 5,943,152 | A | 8/1999 | Mizrahi et al. |
| 5,953,690 | A | 9/1999 | Lemon et al. |
| 5,956,168 | A | 9/1999 | Levinson et al. |
| 6,010,538 | A | 1/2000 | Sun et al. |
| 6,014,241 | A | 1/2000 | Winter et al. |
| 6,020,593 | A | 2/2000 | Chow et al. |
| 6,021,947 | A | 2/2000 | Swartz |
| 6,023,147 | A | 2/2000 | Cargin, Jr. et al. |
| 6,049,413 | A | 4/2000 | Taylor et al. |
| 6,064,501 | A | 5/2000 | Roberts et al. |
| 6,108,113 | A | 8/2000 | Fee |
| 6,111,687 | A | 8/2000 | Tammela |
| 6,115,113 | A | 9/2000 | Flockencier |
| H1881 | H | 10/2000 | Davis et al. |
| 6,160,647 | A | 12/2000 | Gilliland et al. |
| 6,175,434 | B1 | 1/2001 | Feng |
| 6,259,293 | B1 | 7/2001 | Hayase et al. |
| 6,282,017 | B1 | 8/2001 | Kinoshita |
| 6,292,497 | B1 * | 9/2001 | Nakano ............ 372/29.015 |
| 6,366,373 | B1 | 4/2002 | MacKinnon et al. |
| 6,423,963 | B1 | 7/2002 | Wu |
| 6,452,719 | B2 | 9/2002 | Kinoshita |
| 6,473,224 | B2 | 10/2002 | Dugan et al. |
| 6,494,370 | B1 | 12/2002 | Sanchez |
| 6,512,617 | B1 | 1/2003 | Tanji et al. |
| 6,556,601 | B2 | 4/2003 | Nagata |
| 6,570,944 | B2 | 5/2003 | Best et al. |
| 6,580,328 | B2 | 6/2003 | Tan et al. |
| 6,661,940 | B2 | 12/2003 | Kim |
| 6,707,600 | B1 | 3/2004 | Dijaili et al. |
| 6,740,864 | B1 | 5/2004 | Dries |
| 6,801,555 | B1 | 10/2004 | Dijaili et al. |
| 6,837,625 | B2 | 1/2005 | Schott et al. |
| 6,852,966 | B1 | 2/2005 | Douma et al. |
| 6,868,104 | B2 | 3/2005 | Stewart et al. |
| 6,888,123 | B2 | 5/2005 | Douma et al. |
| 6,934,307 | B2 | 8/2005 | DeCustatis et al. |
| 6,934,479 | B2 | 8/2005 | Sakamoto et al. |
| 6,941,077 | B2 | 9/2005 | Aronson et al. |
| 6,952,531 | B2 | 10/2005 | Aronson et al. |
| 6,956,643 | B2 | 10/2005 | Farr et al. |
| 6,957,021 | B2 | 10/2005 | Aronson et al. |
| 6,967,320 | B2 | 11/2005 | Chieng et al. |
| 7,031,574 | B2 | 4/2006 | Huang et al. |
| 7,039,082 | B2 | 5/2006 | Stewart et al. |
| 7,046,721 | B2 | 5/2006 | Grohn |
| 7,050,720 | B2 | 5/2006 | Aronson et al. |
| 7,058,310 | B2 | 6/2006 | Aronson et al. |
| 7,066,746 | B1 | 6/2006 | Togami et al. |
| 7,079,775 | B2 | 7/2006 | Aronson et al. |
| 7,265,334 | B2 | 9/2007 | Draper et al. |
| 7,276,682 | B2 | 10/2007 | Draper et al. |
| 2004/0047635 | A1 | 3/2004 | Aronson et al. |
| 2004/0136727 | A1 | 7/2004 | Androni et al. |
| 2005/0215090 | A1 | 9/2005 | Harwood |

FOREIGN PATENT DOCUMENTS

| | | |
|---|---|---|
| JP | 58140175 | 8/1983 |
| JP | 62124576 | 6/1987 |
| JP | 62235975 | 10/1987 |
| JP | 62281485 | 12/1987 |
| WO | WO 93/21706 | 10/1993 |
| WO | WO 02/063800 | 8/2002 |
| WO | WO 2004/098100 | 11/2004 |

* cited by examiner

OPTICAL MODULATION AMPLITUDE COMPENSATION SYSTEM HAVING A LASER DRIVER WITH MODULATION CONTROL SIGNALS

PRIORITY CLAIM

This application claims priority to U.S. Provisional Patent Application No. 60/819,256 which was filed on Jul. 6, 2006 and is a continuation-in-part from and claims priority to the following U.S. Patent Applications: U.S. patent application Ser. No. 10/993,522 filed Nov. 19, 2004; U.S. patent application Ser. No. 10/933,561 filed Nov. 19, 2004; and U.S. patent application Ser. No. 11/244,484 filed on Oct. 5, 2005 now U.S. Pat. No. 7,265,334, which is a continuation-in-part of U.S. patent application Ser. No. 11/134,715 which was filed on May 20, 2005, which is a continuation-in-part of U.S. patent application Ser. No. 10/933,525 filed Sep. 3, 2004 now U.S. Pat. No. 7,091,564.

FIELD OF THE INVENTION

The invention relates to optic communication systems and in particular to a method and apparatus for optical modulation amplitude compensation.

RELATED ART

Lasers are used extensively in optical communications. Data is transmitted by modulating the current through the laser, which in turn creates an optical "1" or "0" level. However, lasers have a non-linear behavior in terms of their threshold current (the current where stimulated emission begins) and slope efficiency (change in output power for a given change in current). Laser drivers often use automatic power control loops to maintain a constant average output power from the laser, but for high speed data transmission, the extinction ratio (ratio of the optical "1" to optical "0" power level) or optical modulation amplitude must be controlled in order to keep the laser operating in the optimum range for high-speed data transmission. Compensating for variation in extinction ratio is most challenging, and this innovation describes a method to accurately compensate for slope efficiency variation using circuitry that is readily available in many laser drivers today.

Due to the wide spread prevalence of this problem in the art, numerous solutions have been proposed. These include Open Loop (No feedback). Open loop control of both the bias and modulation current has been proposed by use of a look-up table or fixed compensation in order to maintain average power and optical modulation amplitude.

Another solution is use of automatic average power control with open loop control of modulation current. In such a system, the average power remains constant, but modulation current is compensated by means of adjustable temperature compensation, look-up table, or compensation based on some other parameter such as change in bias current.

Yet another proposed solution comprises dual closed-loop control. Such methods attempt to control both average power and optical modulation amplitude using feedback. This can involve peak-detection, use of pilot tones, or other means of controlling or obtaining feedback related to both the laser threshold current and the laser's slope efficiency variation.

Other methods include maintaining the "1" and "0" levels through peak detection of the monitor photodiode current, which follows the optical $P_1$ and $P_0$ levels.

There also exists numerous patents related to prior art dual closed-loop control. One such patent is U.S. Pat. No. 5,850,409, assigned to Maxim, which utilizes average power control and the use of a pilot tone to provide feedback on slope efficiency characteristics and then controlling modulation current to compensate for these changes. Another is U.S. Pat. No. 6,414,974, assigned to Analog Devices, which maintains constant average power and, by monitoring the change in power for a fixed percentage change in modulation current, adjusts the modulation current to keep extinction ratio constant.

Yet another prior art patent is U.S. Pat. No. 6,907,055, assigned to Analog Devices. This reference proposes controlling average power and alternately applies a fixed test signal to the bias current, utilizing feedback and control to adjust modulation current in order to maintain a constant optical modulation amplitude (or extinction ratio). There are other patents, such as U.S. Pat. No. 6,967,320, assigned to Finisar, which attempt to solve the same problem by characterizing a device's behavior at two different temperatures and extrapolate the conditions based on the actual temperature. Systems with look-up tables (open loop) attempt to do the same through device characterization.

SUMMARY

To overcome the drawbacks of the prior art and provide additional advantages, a system for optical modulation amplitude compensation is disclosed herein. In one embodiment, the system comprises an optic signal generator configured to receive a drive signal and generate an optic signal. The optic signal is detected by a detector configured to generate one or more feedback signals which are related to one or more parameters of the optic signal. Also part of this embodiment is an automatic power control module configured to receive the feedback signals and generate a BIAS Mon signal and a TxPower Mon signal. A controller processes the BIAS Mon signal and a TxPower Mon signal to create one or more modulation control signals. A driver receives the modulation control signals and a data signal and converts the data signal to the drive signal, which is in turn provided to the optic signal generator. The controller may comprise a processor, microcontroller, or a state machine.

In one embodiment the detector comprises a photodiode. It is contemplated that this embodiment may further comprise a memory which is accessible by a processor and configured to store machine readable code. The machine readable code may be configured to execute on the processor. In addition, this embodiment may further comprise machine readable code configured to modify an average power of the optic signal and detect a change in bias current resulting from modification of the average power. Then the code will calculate a slope efficiency and adjust a modulation current based on the slope efficiency or change in slope efficiency. It is also contemplated that the one or more feedback signals may comprise a signal representative of bias current or a signal representative of a power level of the optic signal.

Also disclosed herein is a method for optic signal power monitoring in an optic signal transmit module. This is but one possible method of operation. In operation, the system determines an average power and adjusts the average power to create a change in the average power. Then, the operation monitors the bias current in response to the adjustment to the average power and calculates the slope efficiency based on the monitoring of the bias current. Responsive thereto, the operation also adjusts a modulation current based on the slope efficiency or a change in slope efficiency.

This method may occur such that calculating the slope efficiency comprises dividing the change in average power by a change in bias current. This may occur in response to the adjustment to the average power. This method may also include the following additional steps, namely, adjusting the average power a second time and then monitoring the bias current a second time in response to adjusting the average power a second time. Then, calculating a second slope efficiency based on the monitoring of the bias current the second time and adjusting the modulation current based on the change in slope efficiency.

It is also contemplated that this method may also increase or decrease the modulation current based on the slope efficiency. In one embodiment, adjusting the average power comprises increasing or decreasing the average power by less then 10%. In one embodiment the adjustment is less than 5%. In one embodiment the adjustment is from 2% to 4%. In one embodiment the adjustment is variable. In one embodiment monitoring the bias current comprises receiving a feedback signal representing the bias level from an optic signal generator/detector module. The method may also comprise receiving a power level feedback signal representing the optic signal power level and then comparing optic signal power level to a power set signal to generate a transmit power level signal. In addition, the method may further comprise processing the feedback signal representing the bias level and the transmit power level signal and then adjusting the modulation current.

Also disclosed herein is a system for optical modulation amplitude compensation of an optic signal. In one example embodiment, the system comprises an automatic power control module, a controller, and a driver. The automatic power control module is configured to receive an optic signal power feedback signal, a bias level control signal, and a power control set signal, and responsive thereto process one or more of the optic signal power feedback signal, the bias level control signal, and the power control set signal to generate a bias monitor signal. The controller is configured to receive and process the bias monitor signal and in response thereto generate a modulation set signal. The driver is configured to receive the modulation set signal and a data signal and convert the data signal to a drive signal, which is in turn provided to the optic signal generator. At the optic signal generator, the modulation of the drive signal is controlled by the modulation set signal.

In one embodiment the controller is configured to determine the slope efficiency based on the bias monitor signal, and based on the slope efficiency or a change in slope efficiency, generate the modulation set signal. In one embodiment the controller is further configured to change the average power of the optic signal and responsive to the change in average power, detect the corresponding change in bias current. Modulation current may be set based on the change in bias current.

This system may further comprise an optic signal generator configured to receive and convert the drive signal to an optic signal and an optic signal detector configured to generate the optic signal power feedback signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
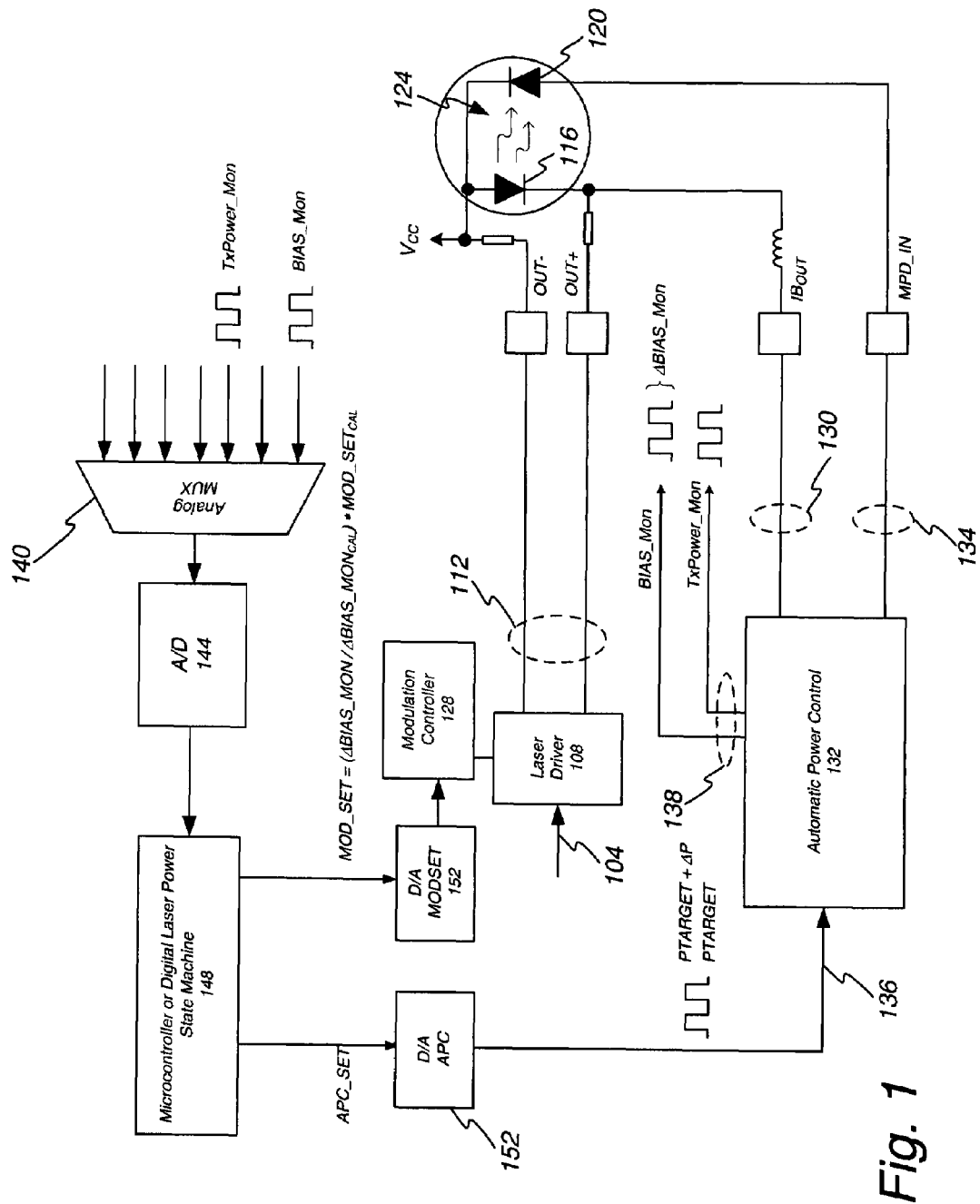
FIG. 1 is a block diagram of an example embodiment of the optical modulation amplitude compensation system.

In general, the innovation disclosed herein utilizes a normal average power control loop. In the system disclosed herein the target average power is adjusted by a small percentage, and the corresponding change in bias current needed to adjust the average power level is monitored. The change in average power divided by the change in bias current is a measure of the laser's slope efficiency. Modulation current is adjusted up or down based on the change in slope efficiency compared to the slope efficiency stored at the time of module calibration.

Numerous benefits result from the design set forth herein. For example, open loop solutions do not actively monitor or control the average power and optical modulation amplitude. They rely mainly on simple temperature compensation techniques or the use of look-up tables. Look-up tables can place additional burden on the manufacturing process, likely needing to be updated with each lot of lasers. In addition, look-up tables compensate for "typical" temperature characteristics, but lasers threshold and slope efficiency will vary from device to device. Open loop solutions are also not able to effectively compensate for laser aging characteristics. Compared to open loop solutions, this innovation controls average power via a feedback loop and actively monitors laser slope efficiency to adjust optical modulation amplitude (OMA). As a result, this innovation can compensate for both temperature and aging effects without the need to characterize individual lasers or laser lots.

In addition, similar advantages exist when compared with implementations that use average power control with open-loop control of modulation current. This innovation controls average power and adjusts modulation current based on the measured laser slope efficiency, providing OMA control based on insight into the actual laser behavior.

Moreover, the methods that rely on pilot tones or a fixed change in modulation current to control extinction ratio or OMA can be sensitive to or put more demand on AC coupling time constants, as well as possible interaction with the automatic power control (APC) loop. In addition, these methods are altering the effective optical modulation amplitude itself during the control process, which can be seen be the receiver circuitry, possibly impacting receiver sensitivity or introducing jitter. These methods can also exhibit slow start-up characteristics and the effect on OMA can vary depending on laser slope efficiency characteristics.

Dual closed-loop methods that alter bias current as part of the control process can also contribute more or less change to the optical characteristics depending on different laser slope efficiencies or changes in slope efficiency over temperature. In addition, such a control method can be slow to settle since interaction between the loops must be prevented while both loops are adjusted.

Dual closed-loop methods that utilize peak detection are generally limited by the response time of the monitor photodiode and are therefore sensitive to data rate and/or the type of encoding used. It is therefore difficult to use these methods at higher data rates or with encoding that does not include long strings of consecutive identical digits.

This innovation alters average power and monitors the change in bias current to determine slope efficiency. Optical modulation amplitude is adjusted based on the change in slope efficiency from the reference slope efficiency (at the time of module calibration).

This innovation can utilize an automatic power control loop designed to control laser average power. Automatic power control loop time constants are often optimized to balance turn-on time with low-frequency cut-off requirements for a particular data rate and/or encoding scheme. This innovation does not have to alter the requirements for the APC loop and therefore allows the optimum turn-on time and LF cut-off balance to be maintained.

In addition, many laser drivers developed today provide a means for monitoring the laser bias current in order to comply with digital diagnostic monitoring standards such as SFF-8472. This innovation utilizes this bias current monitor as part of the solution, putting no further requirements on the laser driver architecture. Laser slope efficiency is monitored by making a small adjustment in the target average power and monitoring the change in bias current required to adjust to this change in average power.

In one embodiment, the desired alteration of the laser average power can be determined once and is then independent of laser slope efficiency characteristics (i.e. the change in power will likely be the same from transmitter to transmitter). With this innovation, the system may be configured wherein only the average power moves. Receiver circuitry, such as transimpedance amplifiers and limiting amplifiers, respond to changes in optical modulation amplitude, and delay, jitter, or sensitivity could be affected by alterations of the modulation amplitude. As an added benefit, optical modulation characteristics are not affected by this technique.

Finally, since temperature and aging effects do not change rapidly, this innovation takes advantage of this fact by operating at a rate that is below any typical low-frequency cut-off for typical applications. It can therefore be implemented with a microcontroller often used in modules already today, or integrated with the laser driver using a state machine or other control methods. Such an implementation can reach the desired operating point within typical module initialization time requirements, and then the conditions can be held upon a transmitter disable such that the operating point is again reached within the required turn-on time.

Turning now to FIG. 1, an example embodiment of the optical modulation amplitude compensation (OMAC) system. This is but one possible example embodiment and as such, other embodiments may be enabled which do not depart from the overall innovation disclosed herein. As an example environment, the method and apparatus disclosed herein may be used in an optical communication system, such as an optical transmitter to monitor and adjust operation of the optic signal generator.

As shown, a data input 104 is provided to a laser driver 108. The two outputs 112 of the driver 108 are provided to an optic signal generator 116, such as a laser, as shown. Any type optic signal generator may be used. As a point of reference, the data from electrical inputs 104 is converted to a drive signal and then to an optic signal by the generator. As is understood, it is important to maintain the proper bias level, power level, and optical modulation amplitude of the generator 116 and the outgoing optic signal 124. As such, a modulation controller 128 provides an input to the driver 108 to establish the desired modulation level. Discussion of the controller 128 is provided below after a discussion of the feedback system and control signal generation system which follows.

Monitoring the output of the signal generator 116 is one or more photo detectors 120. The detector 120 receives a portion of the generated light signal and converts the received portion to an electrical signal that is a feedback signal. The feedback signal is provided to an automatic power control 132 via path 134. The feedback signal represents the monitor photo diode signal MPD_IN as shown. This signal is proportional to the output power of the optic signal and is generally understood in the art. The $IB_{OUT}$ output 130 provides bias current to the optic signal generator 116. The bias monitoring signal is generally proportional to the $IB_{OUT}$ signal such that the ΔBIAS Mon is proportional to the change in bias current when the power target value plus a change (delta) in the power level (PTARGET+ΔP) is applied to optic signal generator 116. In addition, in one embodiment the function of the automatic power control in particular is to set the current in the detector 120 generally to or proportional to PTARGET.

Also input to the automatic power control 132 are other control signals on input 136 which are discussed below. The other control signal from input 136 and the feedback signal via path 134 are processed by the automatic power control to create outputs 130 and 138. On outputs 138 are a BIAS Mon signal and a TxPower Mon signal. In general, the automatic power control 132 is configured to adjust the bias current $IB_{OUT}$ to obtain the desired target power.

The TxPower Mon signal is representative of the actual power output from the laser, which may be considered a ratio. The BIAS Mon signal may be considered an indicator of the bias current to the optic signal generator 116. While the BIAS Mon signal as described is an analog signal, it should also be noted that the BIAS Mon signal could be a digital signal, such as the value set to a digital to analog converter used to control the bias current at $IB_{OUT}$.

Although not shown by a direct connection, the BIAS Mon signal and a TxPower Mon signal feed into a multiplexer 140. The multiplexer 140 has multiple inputs and selectively outputs, base on a control signal or other timing sequence, the multiple inputs to an analog to digital converter 144. The other multiple inputs may comprise any data within an optic module, such as but not limited to any value from a SFF 8472 compliant system.

The output of the analog to digital converter 144 comprises a digital version of the monitored signals, such as the TxPower Mon and/or the BIAS Mon signal. These signals are provided to a processor, microcontroller, or state machine, or any combination thereof (hereinafter microcontroller 148). If so equipped, a state machine may comprise a digital laser power state machine. The control loop may be implemented as a state machine. The microcontroller 148 processes the input signal and/or the programmed target values to create an APC_SET signal and a MOD_SET signal. The APC_SET signal comprises or represents an automatic power control signal that is related to or represents the power target value (PTARGET) and/or a power target value plus a change (delta)

in the power level (PTARGET+ΔP). These values are input to a digital to analog converter 152, which converts these signal(s) to an analog format, which is then provided to the automatic power control 132. Operation of the automatic power control is discussed above. The PTARGET value is established by the microcontroller 148 and it may be stored in memory at the time of factory calibration or established by the laser or installation.

Also output from the microcontroller is the MOD SET signal. The MOD SET signal is calculated based on the following equation.

$$\text{MOD\_SET}=(\Delta \text{BIAS\_MON}/\Delta \text{BIAS\_MON}_{CAL})*\text{MOD\_SET}_{CAL}$$

ΔBIAS MON$_{CAL}$ represents the ΔBIAS MON calibration value established by a user/operator or during manufacture and which may be linked to the particular optic signal generator in use. The MOD SET$_{CAL}$ comprises the calibration value for the modulation current which is usually established during calibration and may be stored in an EEPROM or other memory. The calculated MOD SET value establishes the modulation for the driver, which in turn controls optic signal modulation level. As can be appreciated from this disclosure, the MOD SET value is thus dependent on the monitored BIAS Mon signal from the automatic power control 132, which is in turn based on the feedback from the detector 120. In this manner, the optic signal is controlled based on the detected optic signal and is controlled based on the detected change in bias current when the power level is changed to PTARGET+ΔP. This provides the advantages discussed above.

The output of the D/A MOD SET unit is provided to the modulation controller 128. The controller 128 may be configured to convert the value to an appropriate modulation control signal for use by the driver 108. In one embodiment, the modulation control 128 comprises a current multiplier. This input then controls the modulation of the optic signal.

It should be noted that although shown as a mixed analog and digital format system, the system may be embodied as analog only or digital only, or any variation thereof.

The change in bias current (ΔBIAS MON) when applying PTARGET+ΔP is proportional to the laser slope efficiency. Therefore, the change in the ΔBIAS MON value from the ΔBIAS MON$_{CAL}$ value is proportional to the change in laser slope efficiency. From this, modulation current may be adjusted to maintain desired operation. Using the change in the TxPower Mon signal (ΔTxPower MON) along with ΔBIAS MON, it is possible to directly infer laser slope efficiency. However, since ΔTxPower MON will be proportional to the ΔP value added to PTARGET, it is not necessary to directly determine laser slope efficiency in order to control optical modulation amplitude. It is only essential to have an indication of the change in slope efficiency from the time of factory calibration. This is accomplished using ΔBIAS MON and ΔBIAS MON$_{CAL}$.

Figure 2:
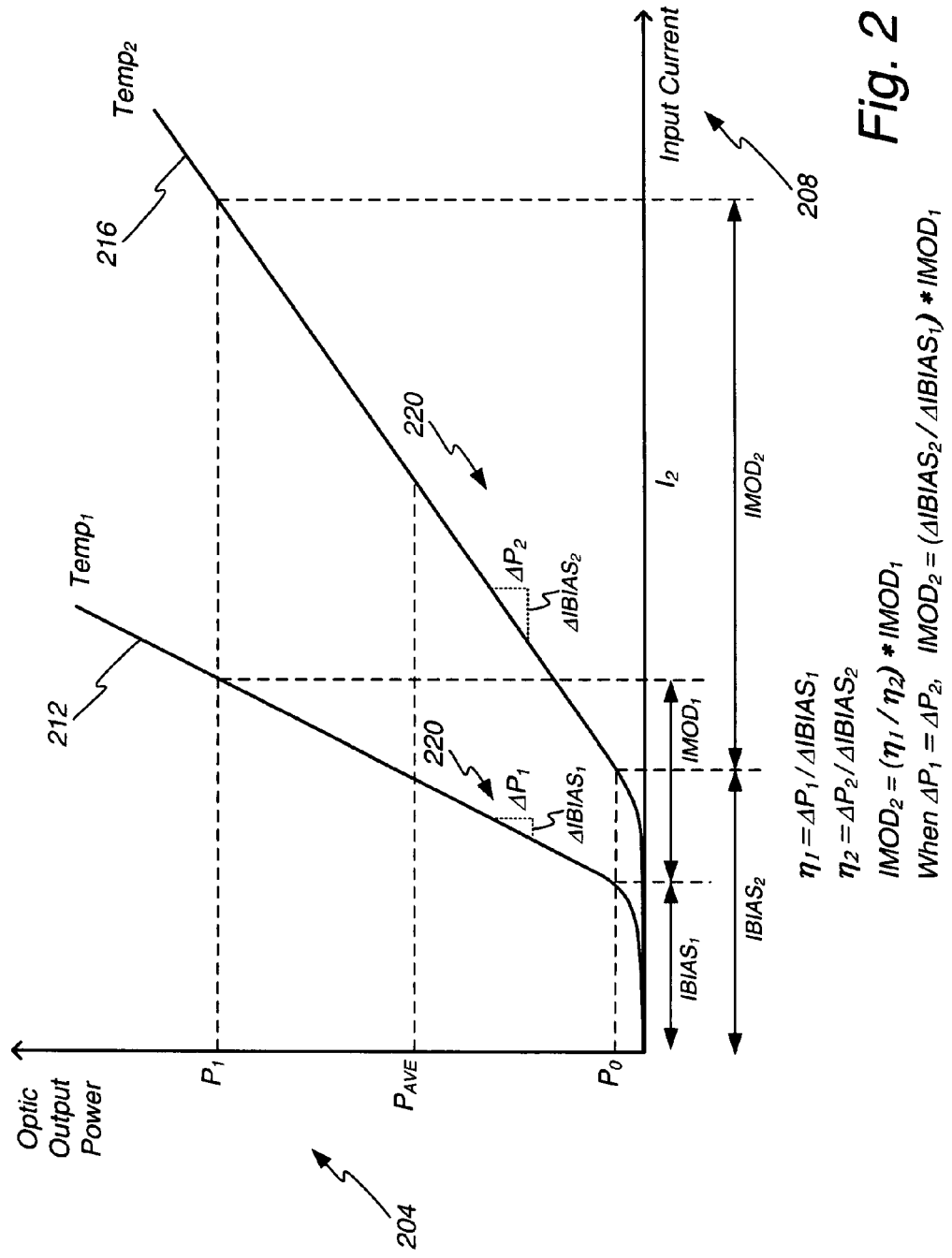
FIG. 2 is a plot of output power versus current for an optical signal generator.

FIG. 2 is a plot of output power versus current for an optical signal generator. The vertical axis 204 represents optic output power while the horizontal axis 208 represents input current. A Temp$_1$ plot 212 is shown as being generated by the optic signal generator at a first temperature and/or time. A Temp$_2$ plot 216 is shown as being generated by the optic signal generator at a second temperature and/or time. As can be seen from the plot of FIG. 2, the slope of each line is different due the different slope efficiency of the optic signal generator at different temperatures. This characteristic can also be affected over the operating life of the optic signal generator. Various other points on the graph are labeled accordingly, such as $P_1$ and $P_0$, corresponding to logic one and logic zero values for the optic signal generator being on and off while biased. $P_{AVE}$ is also shown as the average power point. As temperature increases, the slope decreases. The method and apparatus disclosed herein may compensate for any anomaly that may cause a change in optic signal generator operation. Examples of anomalies that may require compensation include, but are not limited to, changes in temperature, aging effects, or adjustments to the target operating level, such as $P_{AVE}$.

On the horizontal axis 208, the current magnitude values, are shown and labeled, that are required to establish the optic output power. For example, current IBIAS$_1$ establishes optic power level $P_0$ while current IBIAS$_1$ plus current IMOD$_1$ establishes optic power level $P_1$.

Likewise, for example, current IBIAS$_2$ establishes optic power level $P_0$ while current IBIAS$_2$ plus current IMOD$_2$ establishes optic power level $P_1$. As can be seen from these relationships shown in the plot, IBIAS is supplied to the optic device to generate logic zeros. An additional current, IMOD must be supplied to establish an optic logic one value. While this example is for a case where the laser driver outputs 112 are DC coupled to the optic signal generator, the slope relationships remain the same for a case where the outputs 112 are AC coupled to the optic signal generator. The only difference in the AC coupled case is that the IBIAS establishes $P_{AVE}$, with optic power level $P_0$ occurring at IBIAS−½IMOD and optic power level $P_1$ occurring at IBIAS+½IMOD.

It is thus clear that a change in current IBIAS results in a change in optic power output. This is shown graphically at differentials 220 where it can also be observed that depending on the slope efficiency of the optic signal generator, i.e. the slope of the plot, a different amount of IBIAS is required to achieve a certain increase in optic power. The following equations are useful in understanding these relationships. The variable η represents slope efficiency.

$$\eta_1 = \Delta P_1/\Delta \text{IBIAS}_1$$

$$\eta_2 = \Delta P_2/\Delta \text{IBIAS}_2$$

$$\text{IMOD}_2 = (\eta_1/\eta_2)*\text{IMOD}_1$$

Figure 3:
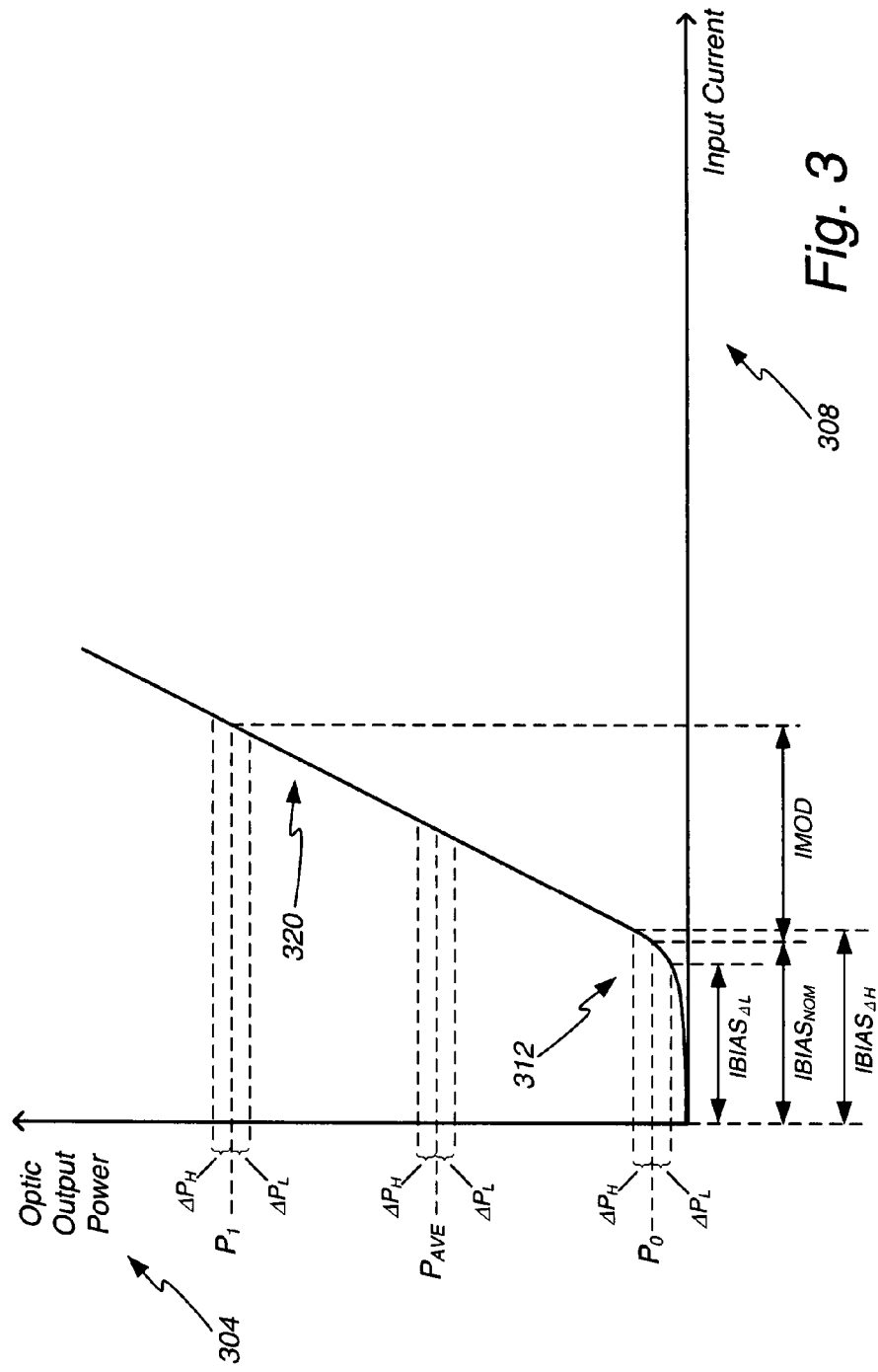
FIG. 3 is a plot showing a threshold detection method, such as for high extinction ratios.
Figure 4:
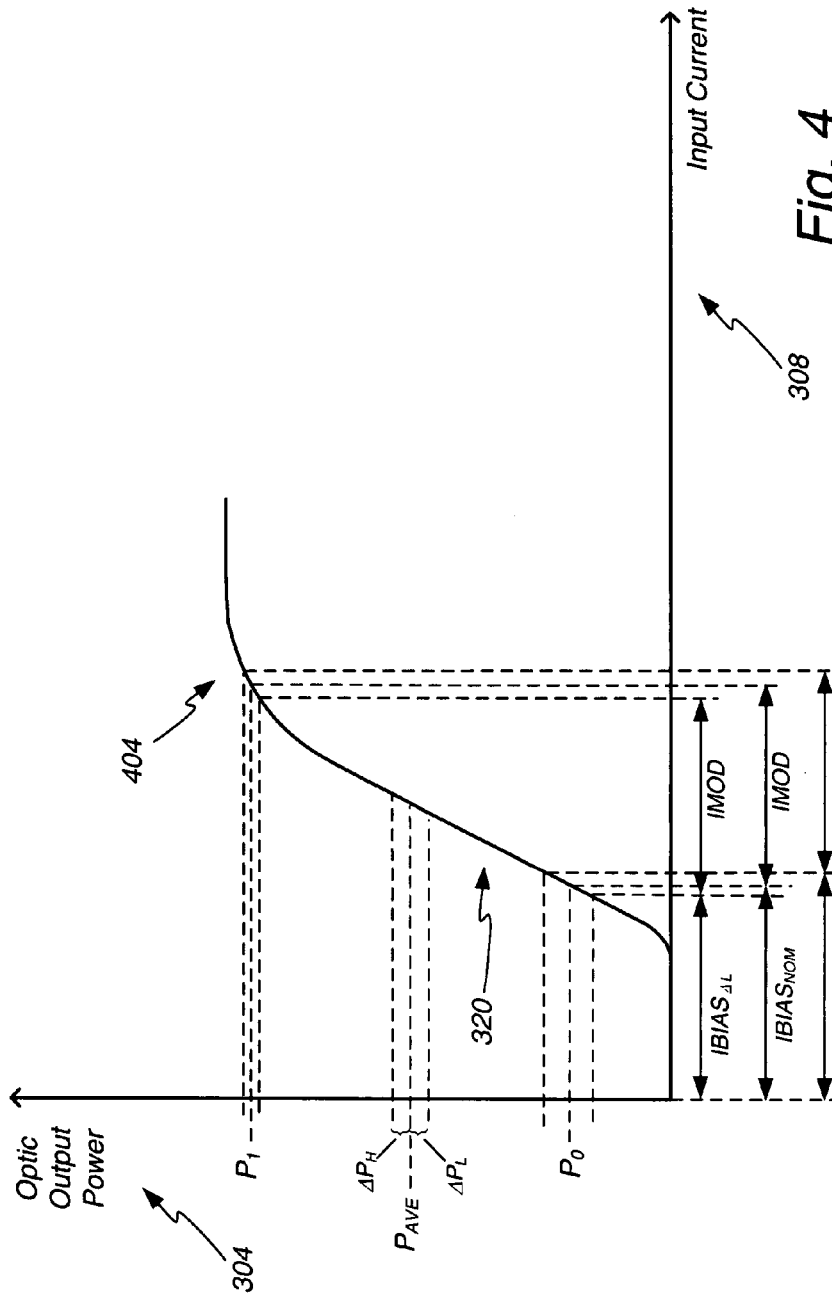
FIG. 4 is a plot showing a plot of detection of a non-linear slope, such as in a roll-over condition.

When $\Delta P_1 = \Delta P_2$, $\text{IMOD}_2 = (\Delta \text{IBIAS}_2/\Delta \text{IBIAS}_1)*\text{IMOD}_1$ FIG. 3 is a plot showing a threshold detection method, such as for high extinction ratios. FIG. 4 is a plot showing a plot of detection of a non-linear slope, such as in a roll-over condition. In both FIGS. 3 and 4, the vertical axis 304 represents optic output power while the horizontal axis 308 represents input current. A roll-over condition 312 exists in FIG. 3 where the slope efficiency plot transitions from a linear to non-linear condition. A roll-over condition 404 exists in FIG. 4 where the slope efficiency plot transitions from a linear to non-linear condition.

As can be seen in FIG. 3, a change in optic output power (average power) results in a change in the input current (Ibias). As shown, at power level $P_1$ an increase in optic output power ($\Delta P_H$) results in a change in the input current. A decrease in optic output power ($\Delta P_L$) results in an identical magnitude of change in the input current. This is true because operation is occurring in a linear region of the slope plot 320. However, at $P_0$ the magnitude of change in Ibias resulting from an increase in optic output power ($\Delta P_H$) is different from the magnitude of change in Ibias resulting from a decrease in optic output power ($\Delta P_L$). This is true because the system is operating at a non-linear condition 312 of the slope plot. In this case, the non-linear condition occurs because the laser is near threshold at $P_0$.

FIGS. 3 and 4 aid in understanding and highlight some methods to improve the functionality of the OMA (optical module amplitude) compensation method over additional conditions. Related to FIGS. 3 and 4, a variable may be provided to adjust the amount of non-linearity that can be tolerated before adjusting the power up or down (i.e. the two delta bias values have to differ by a certain amount before reacting). The addition of this variable does not depart from the general method and system disclosed herein.

In regards to FIGS. 3 and 4, detecting operation in a non-linear portion of the slope plot may be achieved by adjusting the average power and then monitoring for a linear or non-linear change in Ibias. In this exemplary method of operation, a threshold value for change in Ibias is established. The threshold value is a value, to which a change in Ibias will be compared. The threshold value may be considered the largest accepted amount of change in differential in Ibias change resulting from an increase and decrease in average power, which will be allowed before adjusting one or more other parameters of the system to re-establish operation in a linear region, i.e. between a threshold and roll-over condition.

In particular, the system determines the immediate Ibias value, referred to herein as operating Ibias. The system then increases the average power up and detects the amount of change in Ibias, referred to as delta Ibias increase. Then the system adjusts the average power downward, and detects the change in Ibias, referred to as delta Ibias decrease. If the change in Ibias in response to the increase in average power as compared to the change in Ibias in response to the decrease in average power is greater than the threshold, then it can be assumed that the operation of the laser is at or near a non-linear region of operation, such as a threshold (FIG. 3) or a roll-over (FIG. 4) situation. This may also be referred to, for purposes of discussion, as the differential in Ibias, namely, the difference between delta Ibias increase and delta Ibias decrease is the differential in Ibias. The differential Ibias is compared to the threshold. By analyzing whether the delta Ibias increase or delta Ibias decrease is larger, the system can determine if the system is at roll-over condition or threshold condition.

In response to the differential in Ibias being greater than the threshold, the system can adjust the average power away from the non-linear condition to thereby maintain operation of the optic signal generator in a linear region. It is also contemplated that the system may increase or decrease modulation current to avoid operating the system at a non-linear condition. To adjust the average power, it is contemplated that the system may adjust the target average power level, the modulation current in combination with the average power level, or any other aspect.

Also disclosed herein is a method to improve initialization in cases where the module must meet a specified initialization time. This is an optional feature. In one configuration, one or more variables may be selected to set a loop time constant. In one configuration the APC loop has a feature that allows an adjustable gain/time constant, the loop time constant can be configured to track with this option. With a fixed APC loop time constant, it would not be necessary to adjust the OMA loop time constant for proper operation of OMA compensation.

Another aspect disclosed herein is the ability to adjust a resolution filter. The filter helps improve resolution over a range of operating conditions and "smooths" the OMA compensation adjustments. This is an optional feature and provides more flexibility in dealing with the available hardware (i.e. not requiring higher resolution DACs or hardware filtering).

Figure 5:
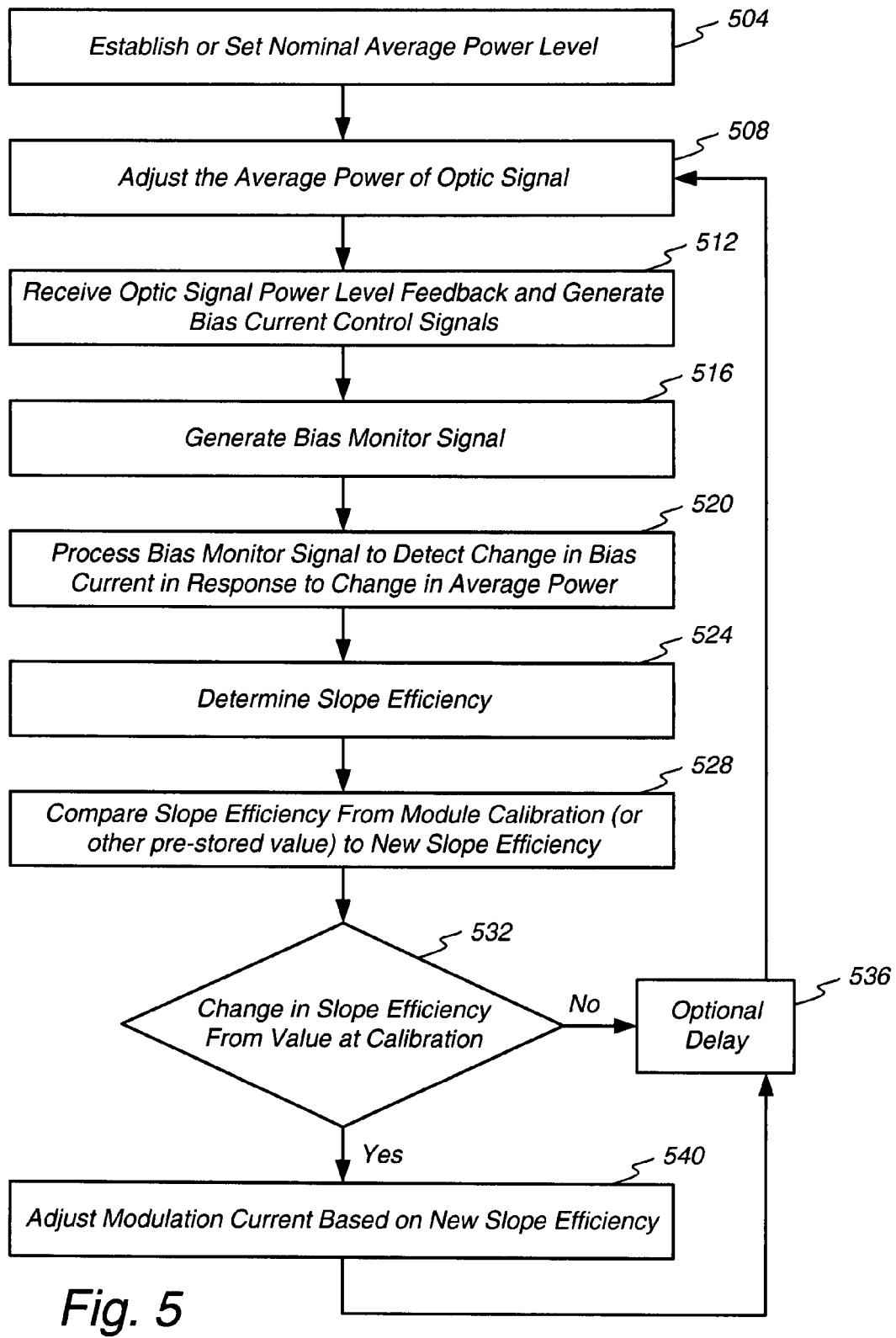
FIG. 5 is an operational flow diagram of an example method of compensation system training.

FIG. 5 illustrates an operation flow diagram of an example method of operation. This is but one possible example method of operation and as such, it is contemplated that one of ordinary skill in the art may modify this method of operation. At a step 504, the operation establishes or determines the average power. This may be set during manufacture, or installation, or during operation as discussed herein. At a step 508, the operation adjusts the average power of the optic signal up or down by a fixed amount. This may occur in any manner, such as by setting a new target average power level, adding or subtracting a fixed percentage of the monitor photodiode current that represents the laser average power, or any other method that alters the average power level, either by analog or digital methods. Any amount of change may be implemented, but as a practical matter, a small change is preferred to not interfere or disturb with data transmission, reception, and decoding. In one exemplary embodiment, less than 10% change occurs. In one embodiment the adjustment is less than 5%. In one embodiment the adjustment is from 2% to 4%. In one embodiment the adjustment is variable. The operation may alternate between adjusting the average power up or down when the procedure passes through step 508. For example, if the average power is adjusted upward the first time through step 508, it is adjusted downward the next time step 508 is executed, such that the average power is maintained at a level equal to the nominal level established in step 504. Other variations may occur, such as up and return to normal before the next iteration, or two up adjustments and then two down adjustments, or any other variation.

At a step 512, the system, such as an automatic power control module, receives the optic signal power level feedback signal and adjusts the bias current signal level accordingly such that the power level feedback signal is equal to the new target average power level. The optic signal power level feedback signal comprises a signal that is, represents, or is proportional to the power level of the optic signal or the average power level of the optic signal. The bias current signal is the bias current presented to the optic signal generator that sets the average power level of the optic signal generator.

Thereafter, the system generates a bias monitor signal based on the feedback signals from step 512. This occurs at a step 516. At a step 520, a processor, controller, or other element processes the bias monitor signal to detect changes in the bias current in response to the change in average power of the optic signal. Then, at a step 524, the operation calculates slope efficiency. In one embodiment, slope efficiency is calculated by dividing the change in average power by the change in bias current.

Then at a step 528 the operation compares the prior slope efficiency to the newly calculated slope efficiency. At a decision step 532, the operation determines if the slope efficiency has changed from the value established at the time of module calibration. If it has not changed, then the operation advances to step 536. It should be understood that if the average power is adjusted by the same amount each time, it is not mandatory to calculate slope efficiency.

Alternatively, step 532 could simply compare the difference in bias currents needed to achieve the change in average power to the original difference in bias currents when this operation was performed at the time of module calibration. Thus, it is also contemplated that the operation may occur without calculating the change in slope efficiency. It is possible to monitor only the change in bias current resulting from the adjustment of the average power and then calculate and implement the appropriate change in modulation current to maintain or establish the desired output power.

At step 536, the operation may optionally pause or delay for a predetermined time before returning to step 508 and repeating the process in a continual optic signal monitoring routine. The pause or delay may be provided to reduce the chances of the power level adjustment of step 508 from interfering with signal transmission, reception, and decoding, or simply to reduce power consumption. It is contemplated that any changes in the optic signal generator characteristics will occur slowly, such as due to temperature change or aging of the optic signal generator, thereby allowing this operation to occur at a rate below normal signal transmission.

If the decision step 532 detects a change in slope efficiency, then the operation advances to step 540, wherein the operation adjusts the modulation current based on the new slope efficiency. It is contemplated that the operation may optionally advance to step 536 or return to step 508 directly.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A system for optical modulation amplitude compensation comprising: an optic signal generator configured to receive a drive signal and generate an optic signal;
   a detector configured to detect the optic signal and generate one or more feedback signals which are related to one or more parameters of the optic signal;
   an automatic power control module configured to receive at least one of the one or more feedback signals and generate a BIAS Mon signal and a TxPower Mon signal;
   a controller configured to process the BIAS Mon signal and a TxPower Mon signal to create one or more modulation control signals; and
   a driver configured to receive the modulation control signals and a data signal and convert the data signal to the drive signal, which is provided to the optic signal generator.

2. The system of claim 1, wherein the detector comprises a photodiode.

3. The system of claim 1, wherein the controller comprises a state machine.

4. The system of claim 1, wherein the controller comprises a processor.

5. The system of claim 4, further comprising a memory, accessible by the processor, and configured to store machine readable code, the machine readable code configured to execute on the processor.

6. The system of claim 5, further comprising machine readable code configured to:
   modify an average power of the optic signal;
   detect a change in bias current resulting from modification of the average power;
   calculating a slope efficiency; and
   adjusting a modulation current based on the slope efficiency or change in slope efficiency.

7. The system of claim 1, wherein the one or more feedback signals comprises a signal representative of bias current.

8. The system of claim 7, wherein the one or more feedback signals further comprise a signal representative of a power level of the optic signal.

9. A method for optic signal power monitoring in an optic signal transmit module comprising:
   determining an average power;
   adjusting the average power to create a change in the average power;
   monitoring the bias current in response to the adjusting the average power;
   calculating the slope efficiency based on the monitoring of the bias current responsive to adjusting the average power; and
   adjusting a modulation current based on one or more of the following:
      the slope efficiency;
      a change in slope efficiency; and
      a change in bias current.

10. The method of claim 9, wherein calculating the slope efficiency comprises dividing the change in average power by a change in bias current which occurs in response to the adjusting the average power.

11. The method of claim 9, further comprising:
    adjusting the average power a second time;
    monitoring the bias current a second time in response to adjusting the average power a second time;
    calculating a second slope efficiency based on the monitoring of the bias current the second time; and
    adjusting the modulation current based on the change in slope efficiency.

12. The method of claim 11, further comprising increasing or decreasing the modulation current based on the slope efficiency.

13. The method of claim 9, wherein adjusting the average power comprises increasing the average power by 2% to 4%.

14. The method of claim 9, wherein monitoring the bias current comprises receiving a feedback signal from an optic signal generator/detector module representing the bias level.

15. The method of claim 14, further comprising receiving a power level feedback signal representing the optic signal power level and comparing optic signal power level to a power set signal to generate a transmit power level signal.

16. The method of claim 15, further comprising processing the feedback signal representing the bias level and the transmit power level signal to adjust the modulation current.

17. A system for optical modulation amplitude compensation of an optic signal comprising:
    an automatic power control module configured to:
       receive an optic signal power feedback signal;
       provide a bias level control signal;
       receive a power control set signal;
       process one or more of the optic signal power feedback signal, the bias level control signal, and the power control set signal to generate a bias monitor signal;
    a controller configured to receive and process the bias monitor signal and responsive thereto, generate a modulation set signal; and
    a driver configured to receive the modulation set signal and a data signal and convert the data signal to a drive signal, which is in turn provided to the optic signal generator, wherein the modulation of the drive signal is controlled by the modulation set signal.

18. The system of claim 17, wherein the controller is configured to determine the slope efficiency based on the bias monitor signal, and based on the slope efficiency or a change in slope efficiency, generate the modulation set signal.

19. The system of claim 18, wherein the controller is further configured to change the average power of the optic signal and responsive to the change in average power, detect the corresponding change in bias current.

20. The system of claim 18, further comprising:
an optic signal generator configured to receive and convert the drive signal to an optic signal; and
an optic signal detector configured to generate the optic signal power feedback signal.

* * * * *